United States Patent
Cheng et al.

(10) Patent No.: US 11,566,895 B2
(45) Date of Patent: Jan. 31, 2023

(54) METHOD FOR CONTINUOUS MEASUREMENT OF RIVER FLOW BASED ON SATELLITE BIG DATA

(71) Applicant: BUREAU OF HYDROLOGY, CHANGJIANG WATER RESOURCES COMMISSION, Wuhan (CN)

(72) Inventors: Haiyun Cheng, Wuhan (CN); Ming Xiong, Wuhan (CN); Shan Deng, Wuhan (CN); Ziyuan Zhu, Wuhan (CN); Xin Zhao, Wuhan (CN)

(73) Assignee: BUREAU OF HYDROLOGY, CHANGJIANG WATER RESOURCES COMMISSION, Wuhan (CN)

( * ) Notice: Subject to any disclaimer, the term of this patent is extended or adjusted under 35 U.S.C. 154(b) by 0 days.

(21) Appl. No.: 17/714,184

(22) Filed: Apr. 6, 2022

(65) Prior Publication Data
US 2022/0316876 A1 Oct. 6, 2022

Related U.S. Application Data

(63) Continuation of application No. PCT/CN2021/109240, filed on Jul. 29, 2021.

(30) Foreign Application Priority Data

Apr. 2, 2021 (CN) .......................... 202110359722.6

(51) Int. Cl.
*G01C 13/00* (2006.01)
*G01C 15/00* (2006.01)
(Continued)

(52) U.S. Cl.
CPC ......... *G01C 13/002* (2013.01); *G01C 13/008* (2013.01); *G01C 15/00* (2013.01);
(Continued)

(58) Field of Classification Search
CPC .... G01C 13/006; G01C 13/004; G01C 13/00; G01C 13/002; G01C 13/008; G01C 5/06;
(Continued)

(56) References Cited

FOREIGN PATENT DOCUMENTS

CN 106885586 A * 6/2017
CN 108460483 A 8/2018
(Continued)

OTHER PUBLICATIONS

Yanzhang Liu, There are flaws in the general large-section water table area calculation method, Heilongjiang Water Resources, 2015, pp. 50-53,57, vol. 1, No. 6.
(Continued)

*Primary Examiner* — Andre J Allen
(74) *Attorney, Agent, or Firm* — Bayramoglu Law Offices LLC

(57) ABSTRACT

A method for continuous measurement of river flow based on satellite big data is provided. The method includes: determining a river reach to conduct flow measurement, reconstructing a cross section of a river channel based on satellite big data, calculating real-time water levels by coupling data of various types of satellites, and performing flow calculation and compilation. The method solves the difficult problem of river flow measurement or continuous measurement of river flow in uninhabited areas, fills the blank of satellite-based flow measurement according to the principle of river dynamics, and greatly expands the range of river flow measurement.

8 Claims, 1 Drawing Sheet

(51) Int. Cl.
*G01S 19/14* (2010.01)
*G06F 17/11* (2006.01)
*G06T 17/05* (2011.01)

(52) U.S. Cl.
CPC .............. *G01S 19/14* (2013.01); *G06F 17/11* (2013.01); *G06T 17/05* (2013.01)

(58) Field of Classification Search
CPC ........ G01C 17/34; G01C 21/16; G01C 25/00; G01C 5/04; G01C 9/00; G01C 9/06; G01C 9/14; G01C 9/18; G01C 9/12; G01N 33/1886; G01N 1/12; G01N 33/18; G01N 1/10; G01N 1/16; G01N 2001/021; G01N 33/1833; G01N 33/24; G01N 1/14; G01N 1/18; G01N 27/06; G01N 21/15; G01N 21/8507; G01N 7/14; G01N 2033/1873; G01N 21/763; G01N 29/024; G01N 3/42; G01N 33/1806; G01N 2001/1012; G01N 27/025; G01N 29/032; G01N 3/066; G01N 33/241; G01N 1/02; G01N 1/04; G01N 1/2035; G01N 1/22; G01N 1/405; G01N 11/08; G01N 15/04; G01N 17/008; G01N 2001/1025; G01N 2015/0088; G01N 2021/1772; G01N 2021/1793; G01N 2021/4769; G01N 2021/556; G01N 2021/6432; G01N 2021/6434; G01N 2035/00881; G01N 21/21; G01N 21/3151; G01N 21/53; G01N 21/55; G01N 21/645; G01N 21/78; G01N 21/80; G01N 2203/0082; G01N 2203/0658; G01N 2203/0682; G01N 2291/02416; G01N 2291/02441; G01N 2291/02827; G01N 2291/02881; G01N 27/023; G01N 27/07; G01N 29/11; G01N 29/348; G01N 3/064; G01N 3/48; G01N 33/1826; G01N 33/246; G01N 15/12; G01N 2001/185; G01N 2001/2021; G01N 2001/388; G01N 2291/02809; G01N 27/4167; G01N 3/34; G01N 9/18; G01N 9/12
USPC .......................................... 73/170.29–170.34
See application file for complete search history.

(56) References Cited

FOREIGN PATENT DOCUMENTS

| | | | |
|---|---|---|---|
| CN | 108645456 A | | 10/2018 |
| CN | 108896117 A | | 11/2018 |
| CN | 111895979 A | | 11/2020 |
| CN | 111401529 B | * | 2/2021 |
| CN | 112464584 A | * | 3/2021 |
| CN | 112729258 A | | 4/2021 |
| CN | 112991425 A | * | 6/2021 |

OTHER PUBLICATIONS

Zhang Jiqun, et al., Estimation of River Discharge Using TOPEX/Poseidon Altimeter Data, Acta Geographica Sinica, 2004, pp. 95-100, vol. 59, No. 1.

Zhao Changsen, et al., Measuring streamflow with low-altitude UAV imagery, Acta Geographica Sinica, 2019, pp. 1392-1408, vol. 74, No. 7.

Laurence C. Smith, Satellite Remote Sensing of River Inundation Area, Stage, and Discharge: A Review, Hydrological Processes, 1997, pp. 1427-1439, vol. 11.

* cited by examiner

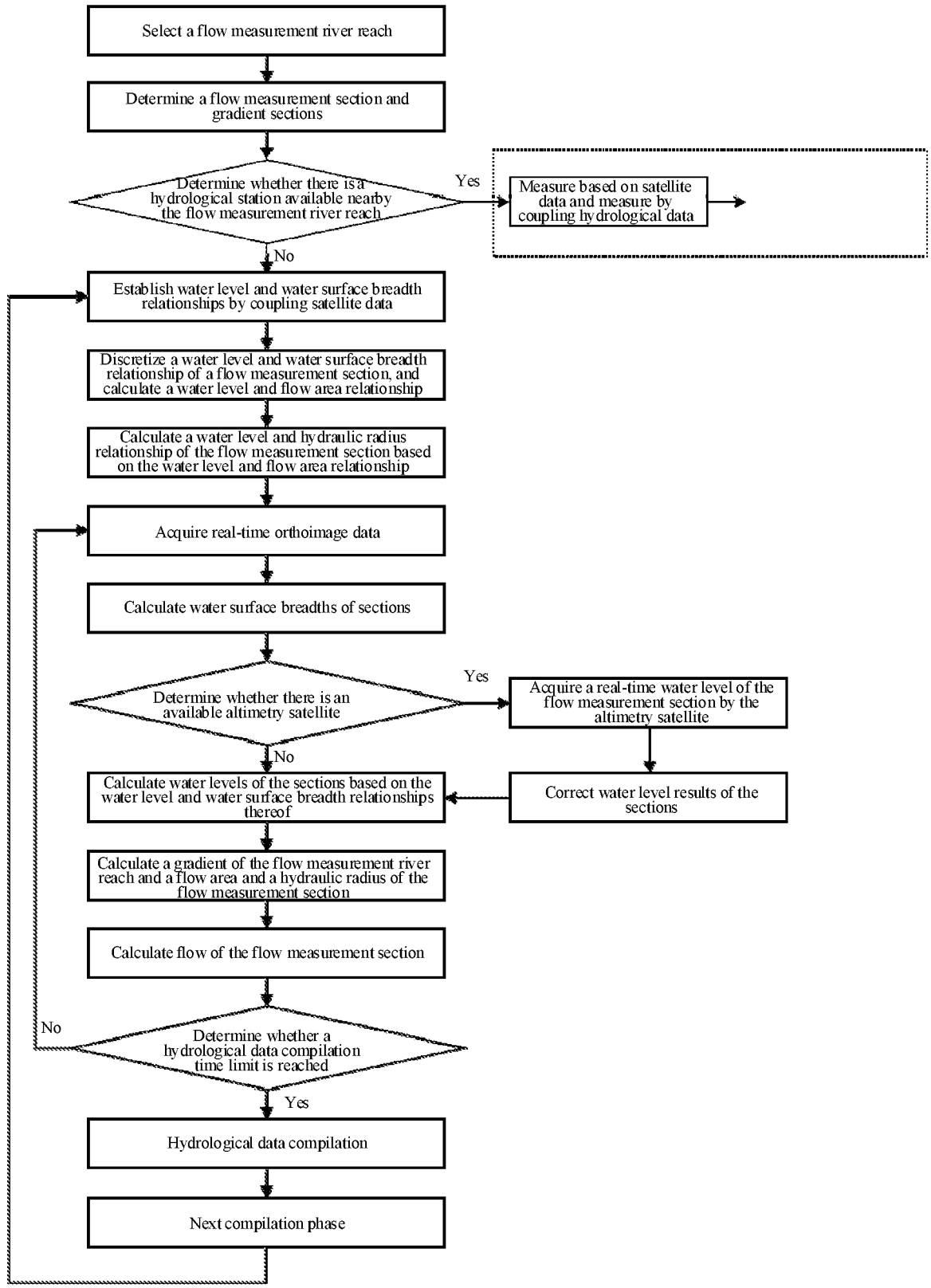

US 11,566,895 B2

METHOD FOR CONTINUOUS MEASUREMENT OF RIVER FLOW BASED ON SATELLITE BIG DATA

CROSS REFERENCE TO THE RELATED APPLICATIONS

This application is a continuation application of International Application No. PCT/CN2021/109240, filed on Jul. 29, 2021, which is based upon and claims priority to Chinese Patent Application No. 202110359722.6, filed on Apr. 2, 2021, the entire contents of which are incorporated herein by reference.

TECHNICAL FIELD

The present invention relates to a method for measuring river flow by a satellite, in particular, to a method for continuous measurement of river flow based on satellite big data. The present invention belongs to the technical field of hydrological measurement applications.

BACKGROUND

Presently, the remote sensing and surveying and mapping of satellites are widely used in various fields of the national economy, for example, in the field of hydrology for water level and flow monitoring. Most of the existing satellite-based flow measurements rely on the water level or water surface breadth acquired by satellites as well as the water level and flow relationship or the water surface breadth and flow relationship of the existing hydrological stations on the ground. Therefore, no matter what type of satellite is used, it is necessary to calibrate or check based on the measurement data of existing ground hydrological stations.

Recently, the planar or vertical resolution of satellites has been further improved. The water level measurement accuracy of space-borne laser, radar and other altimeters reaches within 10 cm, and the planar resolution of high-precision full-color orthophotos reaches within 50 cm. However, the plane and elevation data are generally not available from these two types of satellites simultaneously, or even if they are available simultaneously, the resolution is lower. Due to the launch of surveying and mapping satellites such as the Resource series and the High-resolution series, and the implementation of programs such as the Surface Water and Ocean Topography Satellite (SWOT), the ability and accuracy to monitor the altitude and slope of surface water gradually improve. Although the planar and vertical resolutions can reach several tens of meters, they cannot satisfy the requirements of river flow measurement when used separately. Meanwhile, these satellites can only observe the plane or elevation data above the water surface and cannot acquire cross-sectional or topographic data below the water surface.

For a large number of rivers with a lack of hydrological stations and underwater cross-sectional data, especially those in uninhabited areas in western China, there is currently no mature satellite-based flow measurement method. To solve the above problem, it is necessary to make full use of the plane and elevation difference relationships of high-precision planar and vertical observation satellites and 3D stereo imaging satellites. That is, the historical and real-time observation data of these satellites are coupled according to the regularity of seasonal fluctuation of water level and the regularity of satellite revisit. Thus, based on the satellite big data, the underwater section and water surface gradient of river can be established, and the river flow and process can be calculated by using hydrodynamic methods.

SUMMARY

In order to solve the above problems, an objective of the present invention is to provide a method for continuous measurement of river flow based on satellite big data.

A method for continuous measurement of river flow based on satellite big data includes the following steps:

S1: determining a river reach to conduct flow measurement: selecting a river reach of a river to conduct flow measurement, based on revisit positions, adjacent to each other, of various types of satellites; determining a cross section of a river channel where an echo point of an available high-precision altimetry satellite is located as a flow measurement section; and measuring by a three-dimensional (3D) surveying and mapping satellite, and determining a cross section with a gentle river bank as a flow measurement section, if there is no high-precision altimetry satellite available; and selecting, based on latest high-precision orthophoto/remote sensing image data, cross sections with a gentle river bank at a certain distance upstream and downstream from the flow measurement section as gradient sections, and measuring a distance L between upper and lower gradient sections;

S2: reconstructing the cross section of the river channel based on satellite big data: coupling revisit times and observation elements of an altimetry satellite or a 3D surveying and mapping satellite and an orthophoto/remote sensing satellite available for the flow measurement section based on historical data thereof, and establishing water level and water surface breadth relationship curves of the flow measurement section and the gradient sections;

S3: calculating real-time water levels by coupling data of the various types of satellites: successively acquiring real-time data of the orthophoto/remote sensing satellite passing through the river reach, acquiring water surface breadths $B_{uk}$ and $B_{lk}$ of the upper and lower gradient sections and a water surface breadth $B_k$ of the flow measurement section; calculating real-time water levels $H_{uk}$, $H_{lk}$ and $H_k$ of the upper and lower gradient sections and the flow measurement section according to the water level and water surface breadth relationship curves thereof; determining a roughness coefficient n of the river reach at the water levels; coupling, if there is an altimetry satellite available, the revisit times and observation elements of the altimetry satellite and the orthophoto/remote sensing satellite; and interpolating a water level $H_k'$ of the flow measurement section at a data acquisition time of the orthophoto/remote sensing satellite, as a real-time water level or correction benchmark of the flow measurement section; and S4: performing flow calculation and compilation: calculating a gradient $J_k$ of the river reach according to the real-time water levels $H_{uk}$ and $H_{lk}$ of the upper and lower gradient sections; calculating a flow area $A_k$ according to the water level and water surface breadth relationship curve of the flow measurement section, and calculating flow $Q_k$ of the flow measurement section by using a gradient area method; and compiling by the water level and flow of the flow measurement section according to a hydrological data compilation requirement;

where, during the flow calculation and compilation, according to the water level and water surface breadth relationship curve, the flow area of the flow measurement section is calculated as follows:

S4a1: performing numerical interpolation on $H_f\sim f(B_f)$ or discretizing a correlation graph $H_f\sim B_f$ to form a basic water level and water surface breadth set $(H_{fi}, b_{fi})$ of the cross section of the water channel, where, $H_f\sim f(B_f)$ is a water level and water surface breadth function of the flow measurement section, and $H_f\sim B_f$ is a water level and water surface breadth graph of the flow measurement section;

S4a2: calculating a flow area of the flow measurement section at a discrete water level according to $$A_{fi} = \sum_{i=1}^{n}\left(\frac{B_{fi-1}+B_{fi}}{2}\right)(H_{fi}-H_{fi-1}),$$

where, $B_{fi-1}$ and $B_{fi}$ are respectively (i−1)-th and i-th discrete points for a water surface breadth of the water level and water surface breadth function or the water level and water surface breadth graph of the flow measurement section; $H_{fi-1}$ and $H_{fi}$ are respectively (i−1)-th and i-th discrete points for a water level of the water level and water surface breadth function or the water level and water surface breadth graph of the flow measurement section; $H_{f0}$ and $B_{f0}$ are respectively a discrete point for a lowest water level and a discrete point for a corresponding breadth of the water level and water surface breadth function or the water level and water surface breadth graph of the flow measurement section; and the calculation includes but is not limited to: processing according to a triangular similarity $B_{f0}=0$ and epitaxially processing according to $H_{f0}=(B_{f2}H_{f1}-B_{f1}H_{f2})/(B_{f2}-B_{f1})$; and establishing a water level and flow area function $A_f\sim f(H_f)$ of the flow measurement section, or plotting a correlation graph $H_f\sim A_f$, where, during the flow calculation and compilation, the flow of the flow measurement section is calculated by using the gradient area method as follows:

S4b1: calculating, based on the real-time water level $H_k$ of the flow measurement section, a corresponding flow area $A_k$ by the calculation of the water level and flow area function $A_f\sim f(H_f)$ or interpolating the correlation graph $H_f\sim A_f$, where, $H_k$ is the real-time water level of the flow measurement section calculated by the water level and water surface breadth relationship curve thereof, and $A_f\sim f(H_f)$ is the water level and flow area function of the flow measurement section;

S4b2: discretizing $H_{fi}$ below the real-time water level $H_k$, and calculating a hydraulic radius by $$R_k = A_k \bigg/ \bigg(B_{f1} + 2\sqrt{(H_k-H_{fi})^2+((B_k-B_{fi})/2)^2} + 2\sum_{i=2}^{max(i)}\sqrt{(H_{fi}-H_{fi-1})^2+((B_{fi}-B_{fi-1})/2)^2}\bigg),$$

where $B_{fi}-1$ and $B_{fi}$ are respectively (i−1)-th and i-th discrete points for a water surface breadth of the water level and water surface breadth function or the water level and water surface breadth graph of the flow measurement section; $H_{fi}-1$ and $H_{fi}$ are respectively (i−1)-th and i-th discrete points for a water level of the water level and water surface breadth function or the water level and water surface breadth graph of the flow measurement section; and max(i) is a maximum discrete value of i below the water level $H_k$; and S4b3: calculating flow corresponding to the real-time water level $H_k$ of the flow measurement section according to a Manning formula, $$Q_k = \frac{1}{n}A_k R_k^{2/3}\sqrt{J_k};$$

or calculating by using a downstream-upstream water surface curve method.

Furthermore, lack of data refers to lack of hydrological measurement data and topographic data for the river to conduct flow measurement.

Furthermore, the various types of satellites include, but are not limited to, an altimetry satellite provided with a laser or radar altimeter, an orthophoto/remote sensing satellite, and a resource or surveying and mapping satellite configured for integrated 3D imaging.

Furthermore, in the step of reconstructing the cross section of the river channel based on satellite big data, the revisit times and observation elements of the satellites are coupled as follows:

S2a1: establishing a joint distribution function of a water level $H_f(t)$ of the flow measurement section acquired by the altimetry satellite or the 3D surveying and mapping satellite and a water surface breadth $B_f(t)$ of the flow measurement section acquired by the orthophoto/remote sensing image over time, or plotting hydrographs $H_f(t)\sim t$ and $B_f(t)\sim t$;

S2a2: calculating a water surface breadth at a water level acquisition time of the altimetry satellite or the 3D surveying and mapping satellite and calculating a water level at a water surface breadth acquisition time of the orthophoto/remote sensing satellite; and, alternatively, interpolating the water surface breadth at the water level acquisition time of the altimetry satellite or the 3D surveying and mapping satellite in the hydrograph $B_f(t)\sim t$, and interpolating the water level at the water surface breadth acquisition time of the orthophoto/remote sensing satellite in the hydrograph $H_f(f)\sim t$;

S2a3: establishing a water level and water surface breadth function $H_f\sim f(B_f)$ of the flow measurement section, or plotting a correlation graph $H_f\sim B_f$, according to the water level and the water surface breadth calculated or interpolated; and S2a4: establishing a water level and water surface breadth function $H_g\sim f(B_g)$ of the gradient sections or plotting a correlation graph $H_g\sim B_g$ thereof based on a water level $H_g(t)$ of the gradient sections acquired by the 3D surveying and mapping satellite and a water surface breadth $B_g(t)$ thereof acquired by the orthophoto/remote sensing satellite, according to steps S2a1 to S2a3.

Furthermore, in the step of calculating the real-time water levels by coupling data of the various types of satellites, the roughness coefficient of the river reach refers to values of a natural river roughness table in a hydraulics textbook.

Furthermore, in the step of calculating the real-time water levels by coupling data of the various types of satellites, the correction benchmark refers to the water level $H_k'$ acquired by the altimetry satellite, which serves as a real-time water level correction benchmark for the flow measurement section and the gradient sections.

Furthermore, in the step of performing flow calculation and compilation, the gradient $J_k$ of the river reach refers to a ratio of a real-time water level difference between the upper and lower gradient sections to a length of the river reach between the upper and lower gradient sections, $$J_k=(H_{uk}-H_{lk})/L,$$

where, $H_{uk}$ is the real-time water level of the upper gradient section, $H_{lk}$ is the real-time water level of the lower gradient section, and L is the distance between the upper and lower gradient sections.

Furthermore, the real-time water level correction includes but is not limited to continuous correction of hydrographs of water levels, correlation correction of water levels of the upper and lower sections, and contrast correction of hydrographs of water levels of the upper and lower sections.

The present invention has the following beneficial effects: The present invention solves the difficult problem of river flow measurement or continuous measurement of river flow in uninhabited areas, fills the blank of satellite-based flow measurement according to the principle of river dynamics, and greatly expands the range of river flow measurement.

BRIEF DESCRIPTION OF THE DRAWINGS

The FIGURE is a method for continuous measurement of river flow based on satellite big data according to the present invention.

DETAILED DESCRIPTION OF THE EMBODIMENTS

The technical solutions of the embodiments of the present invention are clearly and completely described below with reference to the drawings. Apparently, the described embodiments are merely a part rather than all of the embodiments of the present invention. All other embodiments obtained by a person of ordinary skill in the art based on the embodiments of the present invention without creative efforts should fall within the protection scope of the present invention.

The present invention provides a method for continuous measurement of river flow based on satellite big data. As shown in the FIGURE, the method includes: determine a river reach to conduct flow measurement, reconstruct the cross section of the river channel based on satellite big data, calculate real-time water levels by coupling data of the various types of satellites, and perform flow calculation and compilation.

S1. Determine a river reach to conduct flow measurement:

Select a river reach of a river to conduct flow measurement, based on revisit positions, adjacent to each other, of various types of satellites; determine a cross section of a river channel where an echo point of an available high-precision altimetry satellite is located as a flow measurement section; and measure by a three-dimensional (3D) surveying and mapping satellite, and determine a cross section with a gentle river bank as a flow measurement section, if there is no high-precision altimetry satellite available.

Select, based on latest high-precision orthophoto/remote sensing image data, cross sections with a gentle river bank at a certain distance upstream and downstream from the flow measurement section as gradient sections and measure a distance L between upper and lower gradient sections.

S2. Reconstruct the cross section of the river channel based on satellite big data:

Couple revisit times and observation elements of an altimetry satellite or a 3D surveying and mapping satellite and an orthophoto/remote sensing satellite available for the flow measurement section based on historical data thereof and establish water level and water surface breadth relationship curves of the flow measurement section and the gradient sections.

The revisit times and observation elements of the satellites are coupled as follows:

S2a1: Establish a joint distribution function of a water level NO of the flow measurement section acquired by the altimetry satellite or the 3D surveying and mapping satellite and a water surface breadth $B_f(t)$ of the flow measurement section acquired by the orthophoto/remote sensing image over time, or plotting hydrographs $H_f(t)$~t and $B_f(t)$~t.

S2a2: Calculate a water surface breadth at a water level acquisition time of the altimetry satellite or the 3D surveying and mapping satellite and calculate a water level at a water surface breadth acquisition time of the orthophoto/remote sensing satellite; and, alternatively, interpolate the water surface breadth at the water level acquisition time of the altimetry satellite or the 3D surveying and mapping satellite in the hydrograph $B_f(t)$~t, and interpolate the water level at the water surface breadth acquisition time of the orthophoto/remote sensing satellite in the hydrograph $H_f(t)$~t.

S2a3: Establish a water level and water surface breadth function $H_f$~$f(B_f)$ of the flow measurement section, or plot a correlation graph $H_f$~$B_f$, according to the water level and the water surface breadth calculated or interpolated.

S2a4: Establish a water level and water surface breadth function $H_g$~$f(B_g)$ of the gradient sections or plot a correlation graph $H_g$~$B_g$ thereof based on a water level $H_g(t)$ of the gradient sections acquired by the 3D surveying and mapping satellite and a water surface breadth $B_g(t)$ thereof acquired by the orthophoto/remote sensing satellite, according to steps S1 to S3.

S3. Calculate real-time water levels by coupling data of the various types of satellites Successively acquire real-time data of the orthophoto/remote sensing satellite passing through the river reach and acquire water surface breadths $B_{uk}$ and $B_{lk}$ of the upper and lower gradient sections and a water surface breadth $B_k$ of the flow measurement section; calculate real-time water levels $H_{uk}$, $H_{lk}$ and $H_k$ of the upper and lower gradient sections and the flow measurement section according to the water level and water surface breadth relationship curves thereof; determine a roughness coefficient n of the river reach at the water levels; couple, if there is an altimetry satellite available, the revisit times and observation elements of the altimetry satellite and the orthophoto/remote sensing satellite; and interpolate a water level $H_k'$ of the flow measurement section at a data acquisition time of the orthophoto/remote sensing satellite, as a real-time water level or correction benchmark of the flow measurement section.

The water level $H_k'$ acquired by the altimetry satellite is taken as the correction benchmark. The real-time water levels of the flow measurement section and the gradient sections are corrected by means of continuous correction of hydrographs of water levels, correlation correction of water levels of the upper and lower sections, and contrast correction of hydrographs of water levels of the upper and lower sections.

Based on real-time orthophoto/remote sensing image data, the roughness coefficient of the river reach refers to values of a natural river roughness table in a hydraulics textbook.

S4. Perform flow calculation and compilation:

According to the real-time water levels $H_{uk}$ and $H_{lk}$ of the gradient sections, the gradient $J_k$ of the river reach refers to a ratio of a real-time water level difference between the upper and lower gradient sections to a length of the river reach between the upper and lower gradient sections, $$J_k = (H_{uk} - H_{lk})/L,$$

where, $H_{uk}$ is the real-time water level of the upper gradient section, $H_{lk}$ is the real-time water level of the lower gradient section, and L is the distance between the upper and lower gradient sections.

The flow area $A_k$ is calculated according to the water level-breadth relationship curve of the flow measurement section, and the flow $Q_k$ of the flow measurement section is calculated according to the gradient area method. According to the specification or management requirements, if a hydrological data compilation time limit is reached, the compilation is carried out according to the compilation specification of hydrological data. If the hydrological data compilation time limit is not reached, the next flow measurement cycle is performed.

The flow area is calculated as follows:

S4a1: Perform numerical interpolation on $H_f\sim f(B)$ or discretizing a correlation graph $H_f\sim B_f$ to form a basic water level and water surface breadth set $(H_{fi}, b_{fi})$ of the cross section of the water channel, where, $H_f\sim f(B_f)$ is a water level and water surface breadth function of the flow measurement section, and $H_f\sim B_f$ is a water level and water surface breadth graph of the flow measurement section.

S4a2: Calculate a flow area of the flow measurement section at a discrete water level according to $$A_{fi} = \sum_{i=1}^{n} \left(\frac{B_{fi-1} + B_{fi}}{2}\right)(H_{fi} - H_{fi-1}),$$

where, $B_{fi-1}$ and $B_{fi}$ are respectively (i−1)-th and i-th discrete points for a water surface breadth of the water level and water surface breadth function or the water level and water surface breadth graph of the flow measurement section; $H_{fi-1}$ and $H_{fi}$ are respectively (i−1)-th and i-th discrete points for a water level of the water level and water surface breadth function or the water level and water surface breadth graph of the flow measurement section; $H_{f0}$ and $B_{f0}$ are respectively a discrete point for a lowest water level and a discrete point for a corresponding breadth of the water level and water surface breadth function or the water level and water surface breadth graph of the flow measurement section; and the calculation includes but is not limited to: process according to a triangular similarity $B_{f0}=0$ and epitaxially process according to $H_{f0}=(B_{f2}H_{f1}-B_{f1}H_{f2})/(B_{f2}-B_{f1})$; and establish a water level and flow area function $A_f\sim f(H_f)$ of the flow measurement section, or plot a correlation graph $H_f\sim A_f$.

The flow of the flow measurement section is calculated by using the gradient area method as follows:

S4b1: Calculate, based on the real-time water level $H_k$ of the flow measurement section, a corresponding flow area $A_k$ by the calculation of the water level and flow area function $A_f\sim f(H_f)$ or interpolating the correlation graph $H_f\sim A_f$, where $H_k$ is the real-time water level of the flow measurement section calculated by the water level and water surface breadth relationship curve thereof, and $A_f\sim f(H_f)$ is the water level and flow area function of the flow measurement section.

S4b2: Discretize $H_j$ below the real-time water level $H_k$, and calculate a hydraulic radius by $$R_k = A_k \Bigg/ \Bigg( B_{f1} + 2\sqrt{(H_k - H_{fi})^2 + ((B_k - B_{fi})/2)^2} +$$

$$2\sum_{i=2}^{max(i)} \sqrt{(H_{fi} - H_{fi-1})^2 + ((B_{fi} - B_{fi-1})/2)^2} \Bigg),$$

where $B_{fi-1}$ and $B_{fi}$ are respectively (i−1)-th and i-th discrete points for a water surface breadth of the water level and water surface breadth function or the water level and water surface breadth graph of the flow measurement section; and $H_{fi-1}$ and $H_{fi}$ are respectively (i−1)-th and i-th discrete points for a water level of the water level and water surface breadth function or the water level and water surface breadth graph of the flow measurement section.

S4b3: Calculate flow corresponding to the real-time water level $H_k$ of the flow measurement section according to a Manning formula, $$Q_k = \frac{1}{n} A_k R_k^{2/3} \sqrt{J_k};$$

or calculate by using a downstream-upstream water surface curve method.

For those skilled in the art, it is obvious that the present invention is not limited to the details of the above embodiments, and the present invention can be implemented in other specific forms without departing from the spirit or basic features of the present invention. The embodiments should be regarded as exemplary and non-limiting in every respect, and the scope of the present invention is defined by the appended claims rather than the above description. Therefore, all changes falling within the meaning and scope of equivalent elements of the claims should be included in the present invention. The reference numerals in the claims should not be considered as limiting the involved claims.

It should be understood that although this specification is described in accordance with the embodiments, not every embodiment includes only an independent technical solution. Such a description is merely for the sake of clarity, and those skilled in the art should take the specification as a whole. The technical solutions in the embodiments can also be appropriately combined to form other implementations which are comprehensible for those skilled in the art.

What is claimed is:

1. A method for a continuous measurement of river flow based on satellite big data, comprising the following steps:

S1: determining a river reach to conduct a flow measurement: selecting the river reach of a river to conduct the flow measurement, based on revisit positions, adjacent to each other, of various types of satellites; determining a cross section of a river channel where an echo point of an available high-precision altimetry satellite is located as a flow measurement section; and measuring by a three-dimensional (3D) surveying and mapping satellite, and determining a cross section with a gentle river bank as the flow measurement section, if there is no available high-precision altimetry satellite; and selecting, based on latest high-precision orthophoto/remote sensing image data, cross sections with the gentle river bank at a certain distance upstream and downstream from the flow measurement section as gradient sections, and measuring a distance L between upper and lower gradient sections;

S2: reconstructing the cross section of the river channel based on the satellite big data: coupling revisit times and observation elements of the available high-precision altimetry satellite or the 3D surveying and mapping satellite and an orthophoto/remote sensing satellite available for the flow measurement section based on historical data thereof, and establishing water level and water surface breadth relationship curves of the flow measurement section and the gradient sections;

S3: calculating real-time water levels by coupling data of the various types of satellites: successively acquiring real-time data of the orthophoto/remote sensing satellite passing through the river reach, acquiring water surface breadths $B_{uk}$ and $B_{lk}$ of the upper and lower gradient sections and a water surface breadth $B_k$ of the flow measurement section; calculating real-time water levels $H_{uk}$, $H_{lk}$ and $H_k$ of the upper and lower gradient sections and the flow measurement section according to the water level and water surface breadth relationship curves thereof;

determining a roughness coefficient n of the river reach at the real-time water levels; coupling, if there is the available high-precision altimetry satellite available, the revisit times and the observation elements of the available high-precision altimetry satellite and the orthophoto/remote sensing satellite; and interpolating a water level of the flow measurement section at a data acquisition time of the orthophoto/remote sensing satellite, as a real-time water level or correction benchmark of the flow measurement section; and S4: performing a flow calculation and compilation: calculating a gradient $J_k$ of the river reach according to the real-time water levels $H_{uk}$ and $H_{lk}$ of the upper and lower gradient sections; calculating a flow area $A_k$ according to the water level and water surface breadth relationship curve of the flow measurement section, and calculating a flow $Q_k$ of the flow measurement section by using a gradient area method; and compiling by the water level and the flow of the flow measurement section according to a hydrological data compilation requirement;

wherein, during the flow calculation and compilation of the step S4, according to the water level and water surface breadth relationship curve, the flow area of the flow measurement section is calculated as follows:

S4a1: performing a numerical interpolation on $H_f \sim f(B_f)$ or discretizing a correlation graph $H_f \sim B_f$ to form a basic water level and water surface breadth set $(H_{fi}, b_{fi})$ of the cross section of the river channel, wherein, $H_f \sim f(B_f)$ is a water level and water surface breadth function of the flow measurement section, and $H_f \sim B_f$ is a water level and water surface breadth graph of the flow measurement section;

S4a2: calculating a flow area of the flow measurement section at a discrete water level according to $$A_{fi} = \sum_{i=1}^{n} \left( \frac{B_{fi-1} + B_{fi}}{2} \right)(H_{fi} - H_{fi-1}),$$

wherein, $B_{fi-1}$ and $B_{fi}$ are respectively (i−1)-th and i-th discrete points for a water surface breadth of the water level and water surface breadth function or the water level and water surface breadth graph of the flow measurement section; $H_{fi-1}$ and $H_{fi}$ are respectively (i−1)-th and i-th discrete points for a water level of the water level and water surface breadth function or the water level and water surface breadth graph of the flow measurement section; $H_{f0}$ and $B_{f0}$ are respectively a discrete point for a lowest water level and a discrete point for a corresponding water surface breadth of the water level and water surface breadth function or the water level and water surface breadth graph of the flow measurement section; and the calculation comprises: processing according to a triangular similarity $B_{f0}=0$ and epitaxially processing according to $H_{f0}=(B_{f2}H_{f1}-B_{f1}H_{f2})/(B_{f2}-B_{f1})$; and establishing a water level and flow area function $A_f \sim f(H_f)$ of the flow measurement section, or plotting a correlation graph $H_f \sim A_f$, wherein, during the flow calculation and compilation of the step S4, the flow of the flow measurement section is calculated by using the gradient area method as follows:

S4b1: calculating, based on the real-time water level $H_k$ of the flow measurement section, a corresponding flow area $A_k$ by a calculation of the water level and flow area function $A_f \sim f(H_f)$ or interpolating the correlation graph $H_f \sim A_f$, wherein, $H_k$ is the real-time water level of the flow measurement section calculated by the water level and water surface breadth relationship curve thereof and $A_f \sim f(H_f)$ is the water level and flow area function of the flow measurement section;

S4b2: discretizing $H_j$ below the real-time water level $H_k$, and calculating a hydraulic radius by $$R_k = A_k \bigg/ \left( B_{f1} + 2\sqrt{(H_k - H_{f1})^2 + ((B_k - B_{f1})/2)^2} + 2\sum_{i=2}^{max(i)} \sqrt{(H_{fi} - H_{fi-1})^2 + ((B_{fi} - B_{fi-1})/2)^2} \right),$$

wherein $B_{fi-1}$ and $B_{fi}$ are respectively the (i−1)-th and i-th discrete points for the water surface breadth of the water level and water surface breadth function or the water level and water surface breadth graph of the flow measurement section; $H_{fi-1}$ and $H_{fi}$ are respectively the (i−1)-th and i-th discrete points for the water level of the water level and water surface breadth function or the water level and water surface breadth graph of the flow measurement section; and max(i) is a maximum discrete value of the water level i below $H_k$; and S4b3: calculating the flow corresponding to the real-time water level $H_k$ of the flow measurement section according to a Manning formula $$Q_k = \frac{1}{n} A_k R_k^{2/3} \sqrt{J_k};$$

or calculating by using a downstream-upstream water surface curve method.

2. The method for the continuous measurement of river flow based on the satellite big data according to claim 1, wherein a lack of data refers to a lack of hydrological measurement data and topographic data for a river to conduct the flow measurement.

3. The method for the continuous measurement of river flow based on the satellite big data according to claim 2, wherein the various types of satellites comprise the available high-precision altimetry satellite provided with a laser or radar altimeter, the orthophoto/remote sensing satellite, and a resource satellite or the 3D surveying and mapping satellite configured for an integrated 3D imaging.

4. The method for the continuous measurement of river flow based on the satellite big data according to claim 3, wherein in the step S2 of reconstructing the cross section of the river channel based on the satellite big data, the revisit times and the observation elements of the satellites are coupled as follows:

S2a1: establishing a joint distribution function of a water level $H_f(t)$ of the flow measurement section acquired by the available high-precision altimetry satellite or the 3D surveying and mapping satellite and a water surface breadth $B_f(t)$ of the flow measurement section acquired by the latest high-precision orthophoto/remote sensing image data over time, or plotting hydrographs $H_f(t)\sim t$ and $B_f(t)\sim t$;

S2a2: calculating a water surface breadth at a water level acquisition time of the available high-precision altimetry satellite or the 3D surveying and mapping satellite, and calculating a water level at a water surface breadth acquisition time of the orthophoto/remote sensing satellite; and, alternatively, interpolating the water surface breadth at the water level acquisition time of the available high-precision altimetry satellite or the 3D surveying and mapping satellite in the hydrograph $B_f(t)\sim t$, and interpolating the water level at the water surface breadth acquisition time of the orthophoto/remote sensing satellite in the hydrograph t;

S2a3: establishing the water level and water surface breadth function $H_f\text{-}f(B_f)$ of the flow measurement section, or plotting a correlation graph $H_f\sim B_f$ according to the water level and the water surface breadth calculated or interpolated; and S2a4: establishing a water level and water surface breadth function $H_g\triangleq f(B_g)$ of the upper and lower gradient sections or plotting a correlation graph $H_g\sim B_g$ thereof based on a water level $H_g(t)$ of the upper and lower gradient sections acquired by the 3D surveying and mapping satellite and a water surface breadth $B_g(t)$ thereof acquired by the orthophoto/remote sensing satellite, according to steps S2a1 to S2a3.

5. The method for the continuous measurement of river flow based on the satellite big data according to claim 4, wherein in the step of calculating the real-time water levels by coupling the data of the various types of satellites, the roughness coefficient of the river reach refers to values of a natural river roughness table in a hydraulics textbook.

6. The method for the continuous measurement of river flow based on the satellite big data according to claim 5, wherein in the step of calculating the real-time water levels by coupling the data of the various types of satellites, the correction benchmark refers to the water level $H_k'$ acquired by the available high-precision altimetry satellite, which serves as a real-time water level correction benchmark for the flow measurement section and the upper and lower gradient sections.

7. The method for the continuous measurement of river flow based on the satellite big data according to claim 6, wherein in the step of performing the flow calculation and compilation, the gradient $J_k$ of the river reach refers to a ratio of a real-time water level difference between the upper and lower gradient sections to a length of the river reach between the upper and lower gradient sections, $$J_k=(H_{uk}-H_{lk})/L,$$

wherein, $H_{uk}$ is the real-time water level of the upper gradient section, $H_{lk}$ is the real-time water level of the lower gradient section, and L is the distance between the upper and lower gradient sections.

8. The method for the continuous measurement of river flow based on the satellite big data according to claim 6, wherein the real-time water level correction comprises a continuous correction of hydrographs of water levels, a correlation correction of water levels of the upper and lower sections, and a contrast correction of the hydrographs of the water levels of the upper and lower sections.

* * * * *